Sept. 17, 1940. D. T. PARRISH 2,215,405
VALVE
Filed Sept. 19, 1938
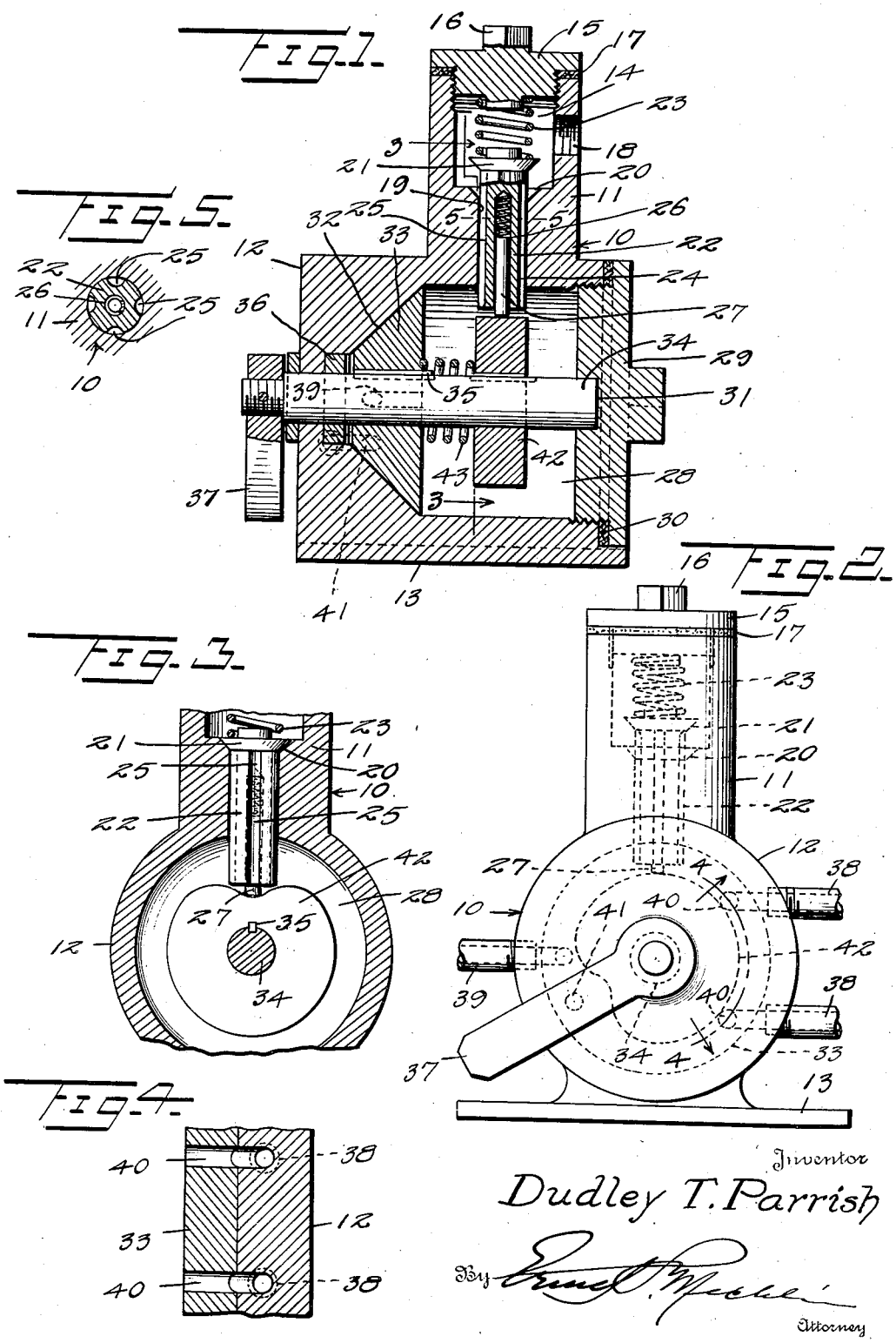
Inventor
Dudley T. Parrish Patented Sept. 17, 1940

2,215,405

UNITED STATES PATENT OFFICE 2,215,405

VALVE

Dudley T. Parrish, Roanoke, Va., assignor to Graham-White Sander Corporation, Roanoke, Va., a corporation of Virginia Application September 19, 1938, Serial No. 230,714

5 Claims. (Cl. 277—7)

The invention, generally considered, relates to valves, and more particularly valves adapted for use in connection with locomotive sanding mechanisms, though its employment is by no means limited thereto.

The principal object of the invention is to provide a combined rotary and poppet valve in which the operation of the rotary valve controls the opening of the poppet valve.

Another object of the invention is to provide in combination a poppet valve adapted to control the ingress of fluid to the rotary valve chamber and to mount within the rotary valve chamber a rotary valve adapted to distribute the fluid admitted to said chamber through one or more ports as desired.

A still further object of the invention is to provide a rotary valve carrying means adapted, upon the rotation thereof, to actuate a poppet valve, the latter being adapted to control the ingress of fluid to said rotary valve chamber.

A still further object of the invention is to provide in connection with a rotary valve a poppet valve actuator, the latter being adapted to cause a rapid and positive actuation of the poppet valve upon the rotary movement of the first named valve.

Still another object of the invention is to provide a valve of the character described in which latch means cooperates with a rotary actuator for releasably maintaining the rotary and poppet valves in a predetermined position.

An additional object is to provide a valve of the character described which will be simple and inexpensive to make and assemble, easy to operate, positive in action, and efficient and durable in service.

To the attainment of the foregoing objects and advantages, the invention preferably consists in the details of construction and arrangement and combination of parts to be hereinafter more fully described and claimed, a preferred embodiment of which is illustrated in the accompanying drawing wherein:

Figure 1 is a central vertical sectional view illustrating the invention and showing the poppet valve raised in its seat, Figure 2 is an elevational view, Figures 3, 4 and 5 are fragmentary views taken, respectively, on lines 3—3, 4—4, and 5—5 of the other figures.

Before describing the invention in detail, it may be well to point out that poppet valves of the type illustrated in the accompanying drawing have long been employed as successful means to prevent the flow of fluid. Poppet valves, however, are difficult to operate and if an attempt is made to provide a plurality of separate ports under the control of the poppet valve great difficulty is experienced. Rotary valves of either the disk or cone type readily adapt themselves to the distribution of fluid through one or a plurality of ports as desired. They, however, present great difficulties in maintaining the same in intimate contact with their seats and if used as a check as well as a distributing valve it is exceedingly difficult and expensive to maintain them in such close contact with their seats as to prevent continued leakage. To rectify these difficulties I have devised a combined poppet and rotary valve in which the advantageous features of both valves are utilized and their disadvantages have been entirely eliminated. The poppet valve of my invention serves merely as a check valve and no attempt is made to utilize the same as a distributing valve, whereas the rotary valve is not employed as a check but is merely a distributing valve and what leakage may occur during operation as a distributing valve is of no importance.

Referring more particularly to the drawing, the numeral 10 designates a valve body or casing which, for convenience of illustration, comprises a plurality of cylindrical casings, the upper casing 11 extending radially from the lower casing 12, the latter being supported on a base 13. Within the upper casing I provide a chamber 14, the upper end of which is preferably closed by a screw cap 15 having the usual projection 16 adapted to fit a wrench. Packing 17 is interposed between the screw cap and the casing 14 in order to provide a fluid tight joint.

The numeral 18 designates an opening to which is connected, by a pipe or other means, a source of fluid pressure. In the bottom wall of the casing 14 I provide an opening 19 having a conical lip 20 adapted to form a seat for the correspondingly formed head 21 of a poppet valve 22. Interposed between the head of the poppet valve and the screw cap 15, I preferably provide a spring 23 adapted to normally maintain the poppet valve in closed position on its seat. The stem 24 of the poppet valve may be of cruciform shape so as to provide a plurality of passages 25 for the fluid pressure. Within the stem 24 I provide a cylindrical opening 26 in which is fitted a spring pressed plunger 27, the purpose and object of which will hereinafter be described.

The opening 19 extends into the chamber 28 of the cylindrical casing 12. The valve stem is adapted to normally project within this chamber 28. This chamber is also closed at one end by a screw cap 29 and interposed between the screw cap and the casing is the packing 30 which will also provide a fluid tight joint. The screw cap is also provided with a centrally disposed cylindrical recess 31. The opposite end of the chamber 28 is preferably of frusto-conical form in order to provide a seat 32 for the frusto-conical rotary valve 33, the latter being mounted on a shaft 34, and is maintained in position thereon by the spline 35. The shaft 34 extends at one end into the recess 31 and its opposite end projects beyond the chamber 28, through a packing 36. The outer end of the shaft 34 is preferably connected to an operating handle 37.

The valve 33 may be provided with a plurality of openings to permit fluid pressure from the chamber 28 to pass to distributing pipes 38 and 39. I have for convenience illustrated the cylindrical valve 33 as having a plurality of ports 40 which in a given position of the said valve are adapted to register with the passages leading to the pipes 38. The valve 33 is also provided with a port 41 which in another position of the valve is adapted to register with the pipe 39. Mounted on the shaft 34, beneath the stem 22 of the poppet valve, I provide a heart shaped disk or cam 42, the surface of which is adapted to engage with the poppet valve stem 22.

When the parts are in the position illustrated in Figure 3 the poppet valve is closed and the ports 40 and 41 of the disk valve are out of register with the openings leading, respectively, to the pipes 38 and 39. Upon the rotation of the disk valve by means of the handle 37, the poppet valve is forced from its seat, permitting fluid pressure to flow from the chamber 14 into the chamber 28 and since the larger diameter of the valve 33 is exposed to the influence of fluid pressure, the valve 33 will be forced into intimate contact with its seat 32 and be maintained in intimate contact so long as fluid pressure is admitted to the chamber 28. Should it be desired to permit the fluid pressure to flow to the pipes 38 the valve is rotated to the position shown in Figure 2, whereupon the ports 40 in the valve register with the ports leading to the pipes 38 and fluid pressure within the chamber 28 is then placed in communication with the pipes 38. To bring the port 41 in register with the opening leading to the pipe 39, the valve 33 is again rotated, at which time it will be obvious that the ports 40 will be out of register with the pipes 38 and the entire fluid pressure within the chamber 28 will be forced through the port 41 and through the pipe 39.

It is also apparent from the disclosure that when the handle 37 is moved to a vertical position the cam 42 will permit the poppet valve to descend under the influence of the spring 23 and to seat so as to prevent fluid pressure from entering the chamber 28.

The valve 33, while splined to the shaft 34, is capable of moving longitudinally of the shaft in order to compensate for wear in the valve and valve seat. I preferably interpose between the valve 33 and the disk 34 a coil spring 43 which constantly urges the valve 33 to contact the seat.

Having now described my invention, what I claim and desire to secure by Letters Patent is:

1. In a valve structure, a hollow body providing an outlet chamber, an extension on said body providing an inlet chamber having a supply pipe leading thereto, there being a passage establishing communication between said chambers, a poppet valve normally closing said passage and having a stem slidable therein, rotary means operable within said outlet chamber cooperating with said stem for controlling the position of said poppet valve, said means including a shaft extending beneath said valve stem, a cam on said shaft against which said stem engages, and latch means carried by said stem and cooperating with said cam for maintaining said valve in a selected position, rotary valve means positioned on said shaft and movable relative to said outlet chamber, spring means interposed between said main valve means and said cam for urging said valve means into contact with its seat, said chamber having a seat for said last mentioned valve means, and means for rotating said shaft.

2. In a valve structure, a hollow body providing an outlet chamber, an extension on said body providing an inlet chamber having a supply pipe leading thereto, there being a passage establishing communication between said chambers, a poppet valve normally closing said passage and having a stem slidable therein, rotary valve means operable within said outlet chamber for cooperating with said stem for controlling the position of said poppet valve, said means including a shaft extending into said outlet chamber, a cam on said shaft against which said stem engages, a rotary valve carried by and longitudinally movable relative to said shaft, spring means interposed between said valve and cam for urging said valve into contact with its valve seat, means for rotating said rotary valve means, and a plurality of ports formed in said valve means for selectively connecting said outlet chamber to one or more outlet ports.

3. A valve structure comprising a body having an inlet chamber, an outlet chamber and a passage connecting them, said body having an inlet port to the inlet chamber and a plurality of outlet ports leading from the outlet chamber, a poppet valve located within the inlet chamber and having a stem slidable through said passage and extending into the outlet chamber, spring means normally holding said valve in seated position closing said passage, rotary means within the outlet chamber cooperating with said stem and adapted upon the rotation thereof to maintain said valve in an open position, said rotary means comprising a shaft extending axially through said outlet chamber and equipped exteriorly of the body with a handle, a cam on said shaft engaging the end of said stem, a rotary valve slidably mounted within said chamber and adapted to control the passage of fluid through said outlet ports, and spring means acting against said cam for urging said valve into contact with its valve seat.

4. A valve structure comprising a body having an inlet chamber, an outlet chamber and a passage connecting them, said body having an inlet port to the inlet chamber and a plurality of outlet ports leading from the outlet chamber, a poppet valve located within the inlet chamber and having a stem slidable through said passage and extending into the outlet chamber, spring means normally holding said valve in closed position, rotary means within the outlet chamber cooperating with said stem for maintaining said valve in open position, said rotary means comprising a shaft extending axially through said outlet chamber and equipped exteriorly of the body with a handle, a cam on said shaft engaging the end of said stem, a cone shaped valve member slidably mounted on said shaft, said body having an end conformingly engaging said cone, ports in said cone for selectively registering with said outlet ports, and a spring interposed between and reacting against said cam and said cone valve for urging said cone valve into engagement with its valve seat.

5. A valve structure comprising a body having an inlet chamber, an outlet chamber, and a passage connecting said chambers, said body having an inlet port to the inlet chamber, a poppet valve located within the inlet chamber and having a stem slidably engaging the walls of said passage and extending into said outlet chamber, said stem being of cruciform shape to permit communication between said chambers, spring means normally holding said valve in seated position closing said passage, rotary means within the outlet chamber cooperating with said stem for maintaining said valve in open position, said rotary means comprising a shaft extending axially through said outlet chamber and equipped exteriorly of said body with a handle, a cam on said shaft engaging the end of said stem, a rotary truncated cone-shaped valve carried by and longitudinally movable relative to said shaft, a valve seat in said body conformingly engaging said cone, a plurality of outlet ports terminating in said valve seat, a spring interposed between said cam and cone for urging said cone into engagement with said valve seat, ports in said cone for selectively registering with said outlet ports, and latch means carried by said valve stem and cooperating with said cam for maintaining said rotary and poppet valves in predetermined positions.

DUDLEY T. PARRISH.